United States Patent [19]

Meyer

[11] Patent Number: 5,923,349
[45] Date of Patent: Jul. 13, 1999

[54] DENSITY-BASED PRINT MASKING FOR PHOTOGRAPHIC-QUALITY INK-JET PRINTING

[75] Inventor: John F. Meyer, San Diego, Calif.

[73] Assignee: Hewlett-Packard Co., Palo Alto, Calif.

[21] Appl. No.: 08/946,295

[22] Filed: Oct. 7, 1997

[51] Int. Cl.⁶ .............................. B41J 2/015; B41J 2/205
[52] U.S. Cl. ................................ 347/43; 347/40; 347/41
[58] Field of Search .................................. 347/15, 40, 41, 347/43

[56] References Cited

U.S. PATENT DOCUMENTS 5,485,180  1/1996  Askeland et al. ......................... 347/15
5,555,006  9/1996  Cleveland et al. ......................... 347/41

*Primary Examiner*—N. Le
*Assistant Examiner*—Lamson D. Nguyen
*Attorney, Agent, or Firm*—Jerry R. Potts

[57] ABSTRACT

A method and apparatus for printing color images by binary construction from individual colorant dots formed in pixel arrays uses a multi-pass print mode and print masks. Based on color map requirements, a pixel is given a density level. Print masks are provided having mask numbers representing a specific density level. A particular colorant dot is formed only on a pass when the mask number is less than or equal to the specific density level for a target pixel.

28 Claims, 2 Drawing Sheets

DENSITY-BASED PRINT MASKING FOR PHOTOGRAPHIC-QUALITY INK-JET PRINTING

BACKGROUND OF THE INVENTION

1. Field of the Invention

The present invention relates generally to dot-matrix printing, more particularly to scanning ink-jet color printing techniques, and more specifically to print-mode and masking techniques for improved photographic image quality printing.

2. Description of Related Art

The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal,* Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994) editions. Ink-jet devices are also described by W. J. Lloyd and H. T. Taub in *Output Hardcopy [sic] Devices,* chapter 13 (Ed. R. C. Durbeck and S. Sherr, Academic Press, San Diego, 1988).

In dot matrix printing, the image to be printed is digitally composed by creating an array of picture elements ("pixels") arranged by rows and columns of dots, specified as a linear density, e.g., 600 dots per inch ("dpi"). In the following description, the word "ink" is used generically for any sort of colorant—e.g., ink, liquid toner, dye, dry toner, and the like as would be known in the art—employed by a hard copy apparatus to form the dot matrix.

FIG. 1 depicts an ink-jet hard copy apparatus, in this exemplary embodiment a computer peripheral printer, 101. A housing 103 encloses the electrical and mechanical operating mechanisms of the printer 101. Operation is administrated by an electronic controller (usually a microprocessor-controlled printed circuit board subsystem, not shown) connected by appropriate cabling to a computer (not shown). Cut-sheet print media 105, loaded by the end-user onto an input tray 107, is fed by a suitable paper-path transport mechanism (not shown) to an internal printing station where graphical images or alphanumeric text is created. Once a printed page is completed, the print medium is ejected onto an output tray 119. A carriage 109, mounted on a slider 111, scans the print medium. An encoder 113 is provided for keeping track of the position of the carriage 109 at any given time. A set 115 of ink-jet pens, or print cartridges, 117A–117D are releasable mounted in the carriage 109 for easy access. In the art, the term "print cartridge" usually designates a self-contained, disposable unit, including a substantial quantity of ink in an internal ink chamber (not shown) of the housing 103. In a "pen" type hard copy apparatus, separate, replaceable or refillable, ink reservoirs (not shown) are located within the housing 103 and appropriately coupled to the pen set 115 via ink conduits (not shown). The present invention is suited to either type ink-jet implementation.

As shown in FIG. 2, each pen 210 has a print head 214 which in turn has a orifice plate 216 and nozzle array 217 configuration; one of the main ink-jet design factors that controls droplet size, velocity and trajectory of the droplets. In a standard color printer, there is provided either one cartridge for each of yellow, magenta, cyan (subtractive primary colors) ink, or a single cartridge having three inks and grouped nozzle arrays (known as primitives) and one cartridge for black ink ("CMY" or "CMYK" hereinafter) are provided. A flex circuit 218 provides electrical interconnects 220 for interfacing the print head to a controller, e.g., a printed circuit board (not shown).

For photographic image quality printing ("PIQP" hereinafter), to be commercially acceptable—namely, to compete with true photochemistry prints—ink-jet printers must deliver artifact-free printing. Moreover, printing must be accomplished using a variety of print media (in order to facilitate the description of the invention, the word "paper" is used hereinafter as a generic terms for any print media such as plain paper, special paper, glossy paper, transparencies, envelopes, and the like), significantly more levels of color are required than occasioned by graphic image or alphanumeric text printing. Several approaches to obtain the necessary levels using standard ink-jet technology have been used, but all require that more drops of ink be placed on each imaging pixel than for non-PIQP image printing. This reduces throughput and uses more ink than is commercially desirable.

Systems have been designed and marketed in which a plurality of print cartridges provides inks having different chemistry in order to provide PIQP capability. That is, for example, a carriage may carry a print cartridge, or set of print cartridges, for cyan and magenta inks of a formula, and yellow ink and a separate print cartridge, or set of print cartridges, for cyan and magenta inks of a formula$_2$ and black ink; six inks total. FIG. 3 shows a two-pen nozzle array arrangement (looking from a print media plane perspective). In one pen print head 301, the nozzle plate 216 has three, linear, double nozzle arrays, one set for yellow ink, one set for a first magenta ink formula, "M1," and one set for a second magenta ink formula, "M2." In the other pen print head 303, the nozzle plate has three similar arrays, one for black ink, "K," one for a first cyan ink formula, "C1," and one for a second cyan ink formula, "C2." Such a color printer system is available from Hewlett-Packard™, designated as a PhotoSmart™ color printer model.

In ink-jet technology, "print-mode" techniques basically refer to the optimization of image quality by the use of specific multiple or partial-inking patterns where dots are printed in each pass of a pen with only a fraction of the total ink required in each section of an image. In essence, print modes distribute rather than accumulate print-mechanism errors that are impossible or expensive to reduce. The result is to minimize the conspicuousness of errors at minimal commercial cost.

For example, one early print mode was dubbed double-drop always. Each pixel was dotted by one nozzle of a primitive in a first pass and by another nozzle in a second pass, ensuring at least one drop of ink on the pixel if a defective drop generator existed in a pen or set of primitives therein.

Another particular print-mode is to divide up a desired amount of ink into more than one pen pass in a checkerboard pattern. Every other pixel location, or groups of pixels referred to as superpixels, is printed on one pass and the blank pixel locations filled in on the next pass or passes (referred to generally as multi-pass scanning or printing). Checkerboarding helps alleviate the problems of bleed (one color running into an adjacent color; particularly noticeable at color boundaries that should be sharp), blocking (transfer of wet ink in one printed image onto the back of an adjacent sheet in an output stack with consequent sticking of the sheets and smearing of lower sheets), and cockle (puckering of the printed paper due to excess ink carrier absorption).

However, checkerboarding tends to exhibit moire pattern errors (print artifacts having regular frequencies, harmonics, etc., generated as a result of regular interacting subsystem interfaces, e.g., a periodic pen carriage drive belt vibration).

In a slightly more advanced technique, checkerboarding is combined with sub-swath width, or sub-pixel width, paper advances between an initial swath scan and a fill swath scan or scans. This technique helps alleviate the problem of banding (noticeable boundary stripes, rather than smooth transitions, between swaths). Interference effects such as moire patterns are still evident with such techniques.

Even more complicated print-mode techniques appear in the literature and the prior art.

The pattern used in printing from each primitive section or pen nozzle array set is known as the "print-mode mask," or "print mask(s)" for short. That is, a print mask is a component of a print mode. Masking relates to assigning particular ink-to-pixel applications to particular printing device operations. In effect, a print mask selects operating parameters such that pixel dotting is optimized. The print mask also defines the number of passes required to reach full dot density, the maximum number of drops per pixel. A number of print masking techniques have been developed. A general summary is provided in U.S. Pat. No. 5,555,006 (Cleveland et al., assigned to the common assignee of the present invention and incorporated herein by reference) at column 4, line 19, through column 7, line 65.

Print masks are generally divided into two types: spatial and temporal. Spatial masks contain the drop deposition patterns for all passes of a multi-pass scanning print head pen for all passes of a swath for each pen, or primitive, full nozzle array. Temporal masks have a separate mask for each drop deposition pattern with a full nozzle array for each separate pass over a swath.

Print modes and print masks are used in conjunction with color maps (for example, red, green, blue (RGB) color triplet data to CMY color triplet data conversion). Such color maps are known in the art. Thus, a print mask identifies and controls when the required ink drops are fired based upon the data processing that has occurred in the controller using the color maps.

There is a need for improvement of print masking techniques in order to allow the placement of multiple drops of ink from more than the traditional CMYK color printer designs in order to achieve PIPQ without requiring excessive use of ink.

SUMMARY OF THE INVENTION

The present invention provides a method for determining the order of placement of ink drops from one or more multiple inks on a particular pixel to obtain the correct color and density for that pixel. In its basic aspects, the present invention provides a density-based dot matrix printing mask method for a color printing system, the system having a color map relating input color data to output color data. Specific steps of the method include providing a print mask for each colorant of the system, the print mask having a set of numbers directly proportional to color density requirement in accordance with the color map for a predetermined number of passes across a target pixel; upon receiving a input color data point, determining a dot density requirement for number of dots of each colorant of the system; for each swath scan, comparing the requirement for number of dots to the mask number; and creating a dot of a colorant only when the mask number is less than or equal to the number of dots requirement.

In another basic aspect, the present invention provides an ink-jet printer apparatus for printing a color image by binary construction from individual ink drops deposited on print media in pixel arrays. The apparatus includes at least one ink-jet pen, having a plurality of inks stored therein, wherein the plurality of inks include primary color inks of a first hue and primary color inks of a second hue, the pen having a print head for firing drops of ink onto an adjacent print media as the pen is scanned across the media such that swaths of color print are formed by the drops of ink using a multi-pass print mode; and a set of print masks, one for each of the plurality of inks, respectively, wherein each of the masks designates a specific drop density level.

It is an advantage of the present invention that it provides a print mask wherein more levels of color are achieved without requiring excessive drops of ink being place on each image pixel per pass.

It is another advantage of the present invention that it provides a print mask methodology applicable to both spatial and temporal print masking systems.

It is another advantage of the present invention that it substantially limits ink coalescence due to inappropriate placement of ink drops spatially and temporally.

It is a further advantage of the present invention that it reduces artifacts caused by paper advance and ink drop placement errors.

It is still another advantage that print masks in accordance with the present invention can be used to accomplish PIQP on a wide range of media, including plain paper as well as special, coated print media.

It is still another advantage of the present invention that multiple drops from one or more ink can be placed on a specific pixel without excessive bleeding of the ink into an adjacent pixel.

Other objects, features and advantages of the present invention will become apparent upon consideration of the following explanation and the accompanying drawings, in which like reference designations represent like features throughout the drawings.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventor(s) for practicing the invention. Alternative embodiments are also briefly described as applicable.

Figure 1:
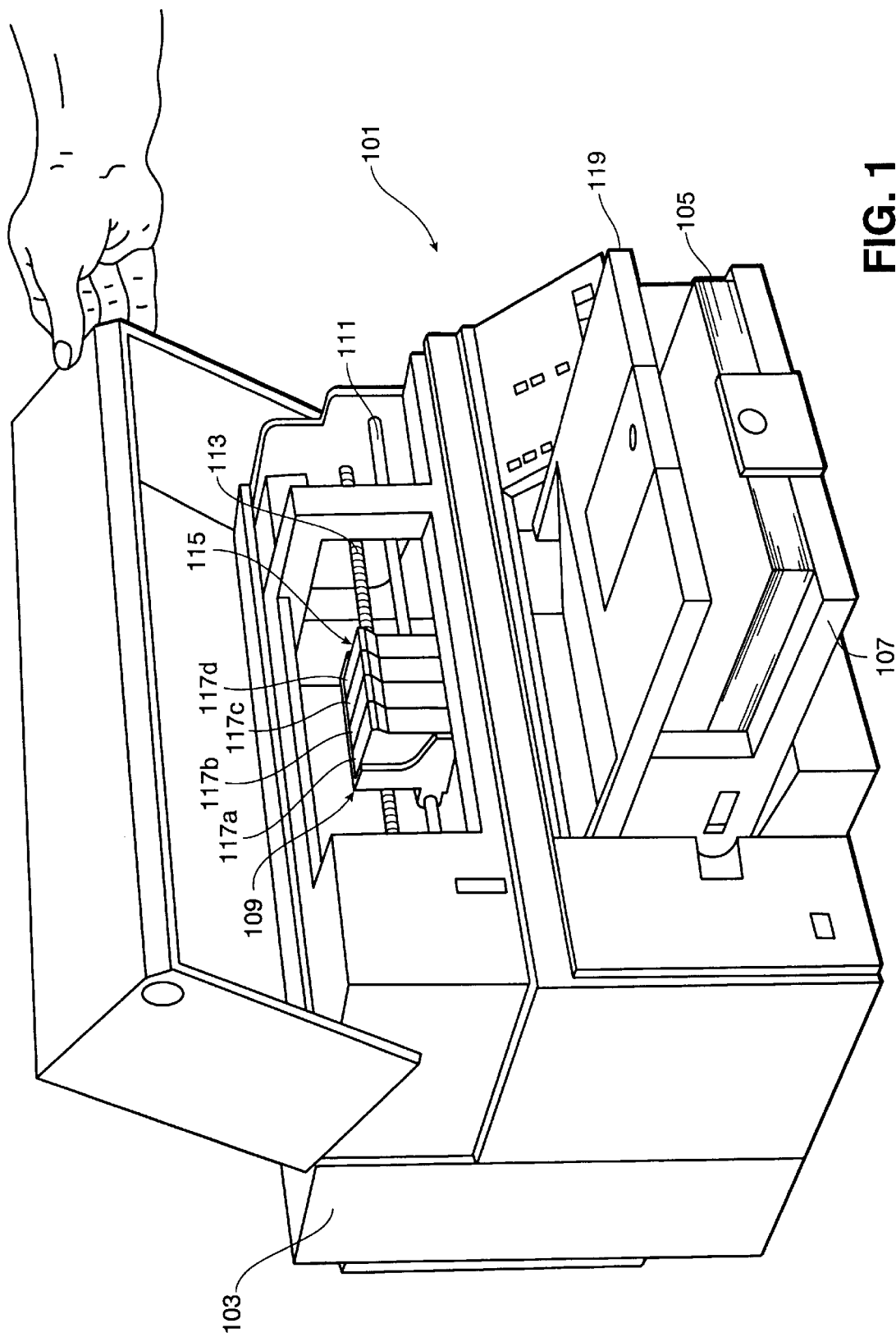
FIG. 1 is an exemplary ink-jet printer.
Figure 2:
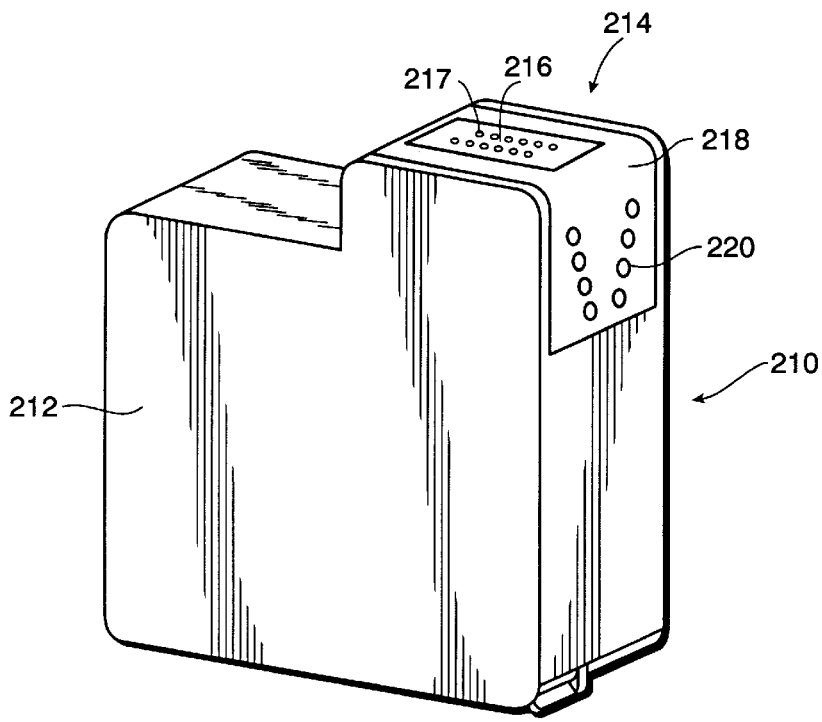
FIG. 2 is an exemplary ink-jet pen for use in a printer as shown in FIG. 1.
Figure 3:
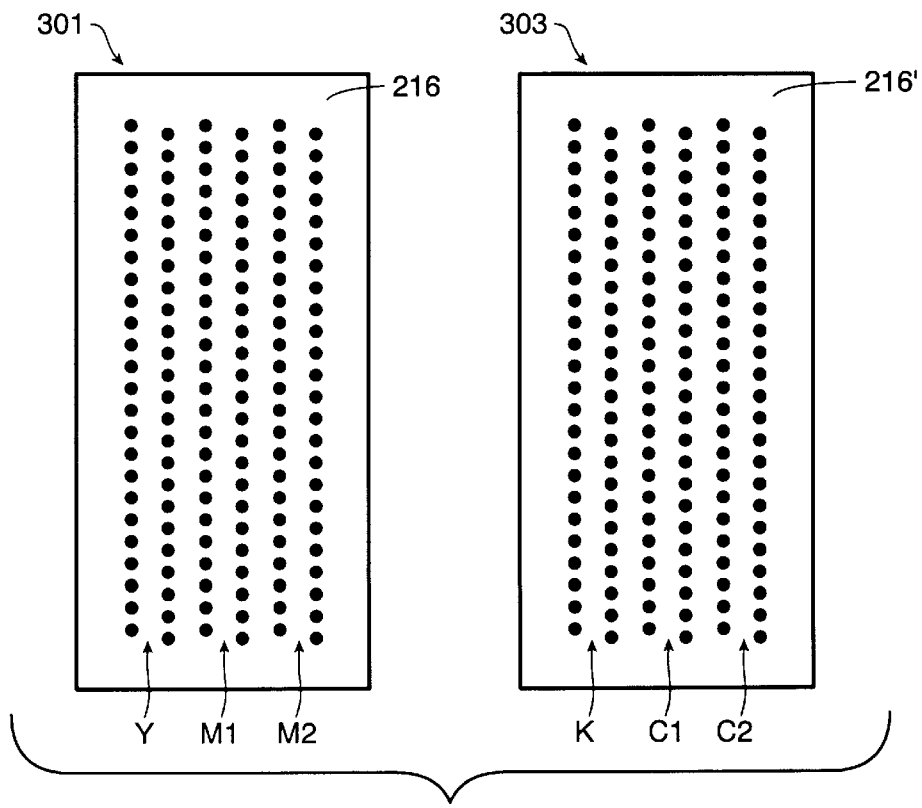
FIG. 3 is an exemplary set of print heads for use in ink-jet pens as shown in FIG. 2.

In an exemplary embodiment, let it be assumed that an ink-jet printer has six inks in two pen bodies: Y,M1,M2 and K,C1,C2 (FIG. 3). The present invention may be adapted to any ink sets for a specific implementation.

The print mode herein determines the total number of drops of each ink per each pixel (i.e., inking proportions, e.g., 1 drop of yellow ink and 2 drops of magenta form a hue of orange). The print mask herein determines in which printing pass a particular drop required by the color map is fired. For the subject printer of the exemplary embodiment, a print mode of a maximum of four drops per pixel per each ink with an overall total of eight drops per pixel maximum (of twenty-four possibilities) is used to create a pixel of a given color. A print mask methodology to arrange the timing and order of lay down of the required quantity of ink drops for each ink on a pixel is described hereinafter.

During color printing, the printer firmware will query the color map based upon the data input, e.g., a set of RGB triplets from a video screen output for a subject pixel, [row 1, column 1] or simply [1,1 ].

A pixel is given a density level designation in accordance with the data as a 1, 2, 3, or 4, going from lowest density to highest density. In other words, per available ink, one to four drops of each ink may be fired at the target pixel, to a total of eight drops maximum from two or more inks. That is, mask numbers relate to the density level required for a particular pixel in the image. For a mask number 1, the lowest density level for that ink is required; mask number 2 represents the drop needed for the next highest density in the color map; mask number 3 to next to highest density; and mask number 4 the highest density of a specific ink is required to achieve the desired color.

Note carefully that this annotation is not designating the next drop to be fired. Each drop has a volume of ink to create a certain predetermined density. It is the total number of drops of ink that give the final pixel density. In other words, the resultant final color density is from the total number of drops deposited on a specific pixel. The annotation therefore is the printing order. Mask numbers represent a specific density level.

For each pass, the printer queries the color map correlation to determine if the particular mask number represents a drop required to be printed on a target pixel.

For example, from the input data, assume that the color requirement for pixel [1,1] is 3 drops of cyan ink. A print mask for cyan is provided for a four pass print mode as follows:

| Pass$_1$ | Pass$_2$ | Pass$_3$ | Pass$_4$ |
|---|---|---|---|
| 12341234 | 34123412 | 41234123 | 23412341 |
| 12341234 | 34123412 | 41234123 | 23412341 |
| 12341234 | 34123412 | 41234123 | 23412341 |

Therefore, for Pass, the mask has a "1" at pixel [1,1] and the printer will fire one drop of ink and so on as shown in TABLE 1:

TABLE 1

| PASS NO. | MASK NO. = | Fire = 1/not fire = 0 |
|---|---|---|
| 1 | 1 | 1 |
| 2 | 3 | 1 |
| 3 | 4 | 0 |
| 4 | 2 | 1 |

In other words, in Pass$_1$, since the mask number is less than the required number of drops, a drop is fired onto the target pixel; in Pass$_2$, the mask number is equal to the required number of drops and again a drop is fired onto the target pixel; in Pass$_3$, the mask number is greater than the required number of drops and the printer does not fire; and in Pass$_4$, the mask number is again less than the required number of drops and a drop is fired onto the target pixel. The process is repeated for each ink of the entire pen set as needed to achieve an appropriate hue called for by the input RGB data specification (or other color conversion scheme being processed).

Generalizing the methodology, for each color ink in the printing system there is a mask set. Each ink is provided with a mask optimizing the best array of mask numbers to achieve the highest quality printing. The specific masks for each ink of the system are formed by testing specific ink formulations empirically. That is, for an RGB input triplet, what combination of eight drops from the available five color inks and black ink of a specific set of pen, or primitives, produces the highest quality color match observationally.

For systems using spatial masking, for a four pass print mask, the spatial mask will require one pattern for each ink. For systems using temporal masking, the temporal mask will require four separate masks for each ink.

To expand the method to other embodiments, e.g., an eight pass print mode, the mask sets are expanded by inserting a zero (or other non-firing command signal) at specific locations in the print mask. For the purpose of additional multi-pass modes, i.e., from a four-pass expanded to an eight-pass mode, the ink flux to each pixel is lowered. That is to say, the same total quantity of ink required for a particular pixel will be the same for both a four-pass print mode and an eight-pass print mode, which avoids ink-jet problems such as bleed and cockle. The deposition rate for each pixel will essentially be fifty percent per pass in the expanded eight-pass mode. While this reduces throughput by a factor of two, artifacts caused by coalescence of ink and bleed are further reduced.

Specific mask sets for pens using inks formulated as: Y=primary yellow, M1=a light magenta, M2=a dark magenta, C1=a light cyan, C2=a dark cyan, and K=black, are provided as an Appendix hereto. Note that a true black ink printing scheme can be replaced by a composite black scheme.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A density-based dot matrix printing mask method for a color printing system, the system having a color map relating input color data to output color data, the method comprising the steps of:

providing a print mask for each colorant of the system, the print mask having a set of numbers directly proportional to color density requirements specified by the color map for a predetermined number of passes across a target pixel;

upon receiving a input color data point, determining a dot density requirement of number of dots of each colorant of the system required for the data point;

for each swath scan, comparing the requirement for the number of dots to the mask number; and creating a dot of a colorant only when the mask number is less than or equal to the number of dots requirement.

2. The method as set forth in claim 1, the step of creating a dot of a colorant further comprising the steps of:

scanning a multi-colorant ink-jet print head across a print media while firing drops of ink forming swaths of inked dots in turn forming a color image on the media;

passing the ink-jet print head across each swath a plurality of times;

firing a drop of ink of a specific colorant of the multi-colorant ink-jet print head during a pass of the ink-jet print head across a swath only when the mask number is less than or equal to the number of dots requirement.

3. The method as set forth in claim 2, the step of creating a dot of a colorant further comprising the steps of:

limiting the passing of the ink-jet print head across each swath to a number of times necessary for providing a total number of drops of ink that prints a final pixel density in accordance with the requirement.

4. The method as set forth in claim 2, the step of creating a dot of a colorant further comprising the steps of:

limiting the passing of the ink-jet print head across each swath to a number of times necessary for providing a total number of drops of a specific colorant of ink that prints a final pixel color in accordance with the requirement.

5. The method as set forth in claim 2, the step of creating a dot of a colorant further comprising the steps of:

scanning each swath in a print mode of a maximum of four drops per pixel per colorant and a total of eight drops per pixel maximum.

6. The method as set forth in claim 1, further comprising:

reducing ink flux to each pixel proportionally to the number of scans of each swath such that total ink density per pixel is maintained at a predetermined maximum volume.

7. An ink-jet printer apparatus for printing a color image by binary construction from individual ink drops deposited on print media in pixel arrays, comprising:

at least one ink-jet pen, having a plurality of inks stored therein, wherein the plurality of inks include primary color inks of a first hue and primary color inks of a second hue, the pen having a print head for firing drops of ink onto an adjacent print media as the pen is scanned across the media such that swaths of color print are formed by the drops of ink using a multi-pass print mode; and a set of print masks, one for each of the plurality of inks, respectively, wherein each of the masks designates a specific drop density level.

8. The apparatus as set forth in claim 7, the set of print masks further comprising:

means for controlling firing of a drop of one of the plurality of inks from the pen only when a predetermined designator of a respective mask for the one of the plurality of inks is less than or equal to a number of drops required to create a specific color pixel of the image.

9. The apparatus as set forth in claim 8, the means for controlling further comprising:

a print mask for each pass of the multi-pass print mode for each the plurality of inks.

10. The apparatus as set forth in claim 9, further comprising:

the plurality of inks including yellow ink, cyan ink having a first hue, cyan ink having a second hue, magenta ink having a first hue, and magenta ink having a second hue.

11. The apparatus as set forth in claim 10, further comprising:

the plurality of inks includes black ink.

12. The apparatus as set forth in claim 8, further comprising:

the means for controlling further including means for limiting maximum drop density per pixel.

13. A printer for depositing a plurality of different color ink droplets onto a print medium, comprising:

at least one printhead for depositing the plurality of different color ink droplets onto the print medium in a color map print mask pattern;

said color map print mask pattern being defined by selected ones of a plurality of different print mask ink color sets, where each individual set is indicative of a base output ink color arranged in an array of numbered print masks and where each individual print mask is a density based print mask defining a pixel color dot density corresponding to a specific input color requirement; and a control program responsive to the selected individual ones of said density based print masks for causing said print head to deposit said plurality of different color ink droplets in specific different color ink drop densities in a predetermined number of swaths.

14. A printer according to claim 13, wherein said control program causes said print head to deposit individual ones of said plurality of different color ink droplets only when a selected numbered print mask has a mask number value no greater than a droplet density number value of a specific number of color ink droplets of said base output ink color for facilitating the formation of a pixel having an observably matched output color corresponding to said specific input color requirement.

15. A printer according to claim 14, wherein said mask number value is at least equal to said droplet density number value.

16. A printer according to claim 14, wherein said mask number value is less than said droplet density number value.

17. A printer according to claim 14, wherein said predetermined number of swaths is between about four swaths and about eight swaths.

18. A printer according to claim 17 wherein the total quantity of color ink droplets required for the formation of said pixel having an observably matched output color corresponding to said specific input color requirement is substantially the same for four swaths and for eight swaths.

19. A printer according to claim 14 wherein said droplet density number value is between about zero and about four.

20. A printer according to claim 17, wherein said color map print mask pattern determines in which one of said swaths a selected droplet of said base color will be deposited.

21. A printer according to claim 13, wherein said mask number values are directly proportional to said droplet density number values.

22. A printer according to claim 13, wherein said plurality of different print mask ink color sets is six sets.

23. A printer according to claim 22 wherein one color set is indicative of a base black.

24. A printer according to claim 23, wherein two color sets are indicative of two different hues of a base color of cyan.

25. A printer according to claim 24, wherein two color sets are indicative of two different hues of a base color of magenta.

26. A printer according to claim 25, wherein one color set is indicative of a base color of yellow.

27. A printer according to claim 22, wherein said color pixel dot density includes a maximum of eight droplets selected from the six sets of different print mask ink color sets.

28. A printer according to claim 13, wherein said plurality of different color ink droplets are distributedly deposited both spatially and temporally to substantially eliminate ink droplet coalescence.

* * * * *